US006023514A

United States Patent [19]

Strandberg

[11] Patent Number: 6,023,514

[45] Date of Patent: Feb. 8, 2000

[54] SYSTEM AND METHOD FOR FACTORING A MERGED WAVE FIELD INTO INDEPENDENT COMPONENTS

[76] Inventor: Malcolm W. P. Strandberg, 82 Larchwood Dr., Cambridge, Mass. 02138-4639

[21] Appl. No.: 08/996,109

[22] Filed: Dec. 22, 1997

[51] Int. Cl.[7] .................... H04B 15/00

[52] U.S. Cl. .................... 381/94.7

[58] Field of Search .................... 381/313, 94.7, 381/26, 92, 80, 77, 94.5, 94.1, 71.1, 66; 379/202, 206; 367/125, 129, 119; 364/400.01

[56] References Cited

U.S. PATENT DOCUMENTS

| | | | |
|---|---|---|---|
| 4,051,330 | 9/1977 | Cole . | |
| 4,471,171 | 9/1984 | Köpke et al. . | |
| 4,689,820 | 8/1987 | Köpke et al. . | |
| 4,868,517 | 9/1989 | Waldhauer et al. . | |
| 4,879,749 | 11/1989 | Levitt et al. . | |
| 4,992,966 | 2/1991 | Widin et al. . | |
| 5,278,912 | 1/1994 | Waldhauer . | |
| 5,513,265 | 4/1996 | Hirano | 381/66 |
| 5,602,962 | 2/1997 | Kellermann | 381/92 |
| 5,627,799 | 5/1997 | Hoshuyama | 367/119 |
| 5,835,608 | 11/1998 | Warnaka et al. | 381/94.7 |

OTHER PUBLICATIONS

Kuperman et al., Beamforming with annealing, Jan. 29, 1990(pub: Jun. 11, 1990), pp. 1802–1810, Washington, DC.

Collins et al., Optimal beamforming, Jul. 24, 1992(pub: Dec. 17, 1992), pp. 1851–1865, Washington, DC.

*Primary Examiner*—Vivian Chang

*Attorney, Agent, or Firm*—Bourque & Associates, P.A.

[57] ABSTRACT

A system and method for factoring a merged wave field, such as a merged acoustic wave field, into independent source signals uses an array of sensors to sense the merged wave field and a signal processor to determine the factored source signal data. One application for the system and method is in a hearing aid to allow an individual to selectively listen to one individual in a group of individuals speaking simultaneously. The system and method factors the merged wave field by predicting the source signals and combining the predicted source signals with source delay values associated with each of the sound or energy sources to form predicted sensor signals. The source delay values can be set as predetermined values or can be calculated using a cross-correlation process. The predicted sensor signals are compared to the actual sensor signals output by each sensor to determine a prediction verification factor. The predicted source signals are adjusted using a random process that minimizes the prediction verification factor. The adjustment and verification of the predicted source signals is performed iteratively until the prediction verification factor reaches a predetermined minimum value. The predicted source signals are then output as factored source signals and can be selected for further processing, such as by transmitting the signal to the user.

25 Claims, 7 Drawing Sheets

SYSTEM AND METHOD FOR FACTORING A MERGED WAVE FIELD INTO INDEPENDENT COMPONENTS

FIELD OF THE INVENTION

The present invention relates to signal processing systems and methods and in particular, to a system and method for factoring a merged wave field, such as an acoustic wave field, into independent components or source signals generated by each of the respective energy sources that create the merged wave field.

BACKGROUND OF THE INVENTION

A merged wave field is produced by multiple energy sources, such as acoustic sources, that independently generate source signals that combine to form the merged wave field. A merged wave field can be detected using conventional sensors or transducers and can be processed using conventional signal processing techniques. Prior art signal processing systems, however, have a limited ability to selectively determine the source signals attributed to each of the independent energy sources from a detected merged wave field. Factoring a merged wave field into independent source signals is particularly difficult where the signals generated by the energy sources have a complex waveform, such as speech or other complex acoustic signals.

One type of merged wave field that is commonly detected and processed is an acoustic wave field produced by multiple acoustic sources such as by a hearing aid. Transducers, microphones or other sensors are used to detect the acoustic wave field and conventional signal processing techniques are used to process the detected acoustic signal. The acoustic wave field, however, often includes many undesirable acoustic signals or noises that mask or corrupt the desired signals to be measured, transmitted or further processed. Conventional signal processing systems have attempted to filter these undesirable acoustic signals or noises and focus on one or more of the independent acoustic signals generated by respective acoustic sources.

One of the most common complaints of hearing aid users, for example, is that background noise impedes the understanding of speech. Methods currently used to reduce background noise in hearing aids employ filtering techniques in which the frequency regions containing high noise levels are eliminated. Although some steady state noises, such as automobile or other machine sounds, can be effectively suppressed, human speech is the most difficult type of noise to filter and often the most common type of acoustic noise encountered by a hearing aid. The wearer of a hearing aid often has difficulty focusing on one voice or sound source when faced with multiple voices such as is the case in, for example, party noise or a group conversation.

Another common problem is that of reverberation produced by echoes or acoustic reflections off walls, ceiling, and other surfaces in a room. The reflection of the sound acts like additional virtual independent sound sources and can interfere with both the quality and the intelligibility of the speech being detected.

Existing signal processing techniques have been unable to effectively separate a speech signal from multiple speech sources encountered. Past attempts at suppressing undesirable speech noise have employed multiple microphones and an adaptive array approach. An array of sensors or multiple microphones receive the merged acoustic wave field, and the signals from the array of sensors are combined in such a way that the resulting output maximizes the desired signal with respect to the unwanted signals. The sound or speech that the individual wants to listen to is enhanced and the noise or unwanted acoustic signals are suppressed. This approach depends upon the interaction of the different types of microphones comprising the array and the directional characteristics of the microphones. By co-processing the signals acquired by the different microphones having different directional characteristics, the noise or unwanted signals are canceled relative to the desired sound signal.

This approach has met with limited success in simple conversational settings but is unable to provide an independent source signal from a single sound source. The signal output of the adaptive array approach provides a scalar output, i.e. a weighted sum of the acoustic signals from all of the sound sources. Thus, this approach does not provide an independent acoustic signal from a single sound source alone and therefore is limited when multiple sound sources are present. The adaptive array approach is also highly dependent on microphone directivity and the accurate determination of the bearings of the sound sources. Because of the sensitivity to source bearing errors, the adaptive array approach has difficulty handling the effects of reverberation where the reverberating sound comes from so many directions.

Accordingly, a need exists for a system and method for factoring a merged wave field, such as an acoustic wave field, into independent components or source signals attributed to independent energy sources, such as one or more sound sources. A need exists for a system and method that factors the merged wave field into independent components without being significantly affected by source bearing errors and reverberation. In particular, a need exists for a hearing aid or other type of sound receiving and processing system that can selectively process and transmit a sound signal from a single sound source among multiple sound sources.

SUMMARY OF THE INVENTION

The present invention features a system and method for factoring a merged wave field, such as an acoustic wave field, into independent source signals. Each of the independent source signals is generated by a respective one of a plurality of energy sources, such as acoustic sources, that together produce the merged wave field. The present invention can also be used to factor electromagnetic fields into independent source signals as well as other types of merged energy wave fields generated by a plurality of energy sources.

The method comprises: sensing the merged wave field with an array of sensors; converting the merged wave field sensed by each of the plurality of sensors into a plurality of electrical sensor signals representing the merged wave field sensed by each of the sensors; digitizing each of the electrical sensor signals to form sampled sensor signal data representing the merged wave field sensed by each of the sensors; establishing a plurality of predicted source signal data arrays, for storing predicted source signal data corresponding to each of the energy sources; obtaining source delay values for each of the energy sources, wherein the source delay values represent a time differential of each of the independent source signals arriving at each sensor; verifying the replicated sensor signal data by combining the predicted source signal data corresponding to each of the energy sources with respective source delay values for each of the energy sources to produce replicated sensor signal data corresponding to each sensor and by calculating a prediction verification factor using the replicated sensor signal data and the sampled sensor signal data; adjusting the predicted source signal data using a random process; repeating the steps of verifying and adjusting the predicted source signal data for a plurality of iterations until the prediction verification factor reaches a predetermined value wherein the predicted source signals are verified; and outputting verified predicted source signals as the factored independent source signals.

One example of the prediction verification factor is the mean squared difference of the sampled sensor signal data and the replicated sensor signal data.

The step of adjusting the predicted source signal data preferably includes: (a) randomly choosing one of an incremental increase and an incremental decrease of a predicted source signal data element from the predicted source signal data arrays; (b) calculating an incremental prediction verification factor based upon the chosen incremental increase or incremental decrease of the predicted source signal data element; (c) determining whether to adjust the predicted source signal data element based upon the incremental prediction verification factor; and (d) repeating steps (a) through (c) for each predicted source signal data element in each of the predicted source signal data arrays.

The preferred step of determining whether to accept the adjustment of each of the predicted source signal data values includes: accepting the adjustment if the incremental prediction verification factor is negative; and accepting the adjustment if an exponential function of the incremental prediction verification factor, $\exp(-dE/T)$, is greater than a random number between zero and 1, where T is a control parameter modified with each iteration of the step.

According to one method, the step of obtaining the source delay values includes assigning predetermined source delay values for each of the energy sources based upon an assumed arrangement of the sources and sensors. According to another method, the step of obtaining source delay values includes performing a cross correlation process. The cross correlation process comprises the steps of: (a) selecting segments of a pair of sampled sensor signals; (b) filtering each segment of the pair of sampled sensor signals to form first and second filtered sensor signal segments; (c) calculating a scalar product of the first and second filtered sensor signal segments; (d) saving the scalar product in a cross-correlation array; (e) shifting an index of the first filtered sensor signal segment by one unit to form a shifted first filtered sensor signal segment; (f) repeating steps c-e until the shifted first filtered sensor signal segment has been shifted more than a predetermined maximum number of units; and (g) determining the source delay value based upon an index of the maximum element in the cross-correlation array. The cross-correlation process can be repeated using other sampled sensor signals with the source delays saved in a buffer and the most probable source delay selected.

In one example, the method further includes selecting one of the energy sources as a target source; converting the factored independent source signal data corresponding to the target source signal into a factored acoustic signal, and transmitting the factored acoustic signal to one or both ears of a user. Alternatively, the factored source signal data can be recorded or further processed.

The present invention also features a system for factoring the merged wave field into independent source signals. The system comprises an array of sensors, for sensing the merged wave field and converting the merged wave field into a plurality of electrical sensor signals. A digitizer is connected to the array of sensors, for digitizing the electrical sensor signals to form a number of sampled sensor signals corresponding to each of the sensors. A signal processor is connected to the digitizer, for processing the sampled sensor signals and for determining the factored source signals.

The signal processor preferably includes sampled sensor signal data arrays, for storing the plurality of sampled sensor signals and predicted source signal data arrays for storing the predicted source signal data corresponding to each of the energy sources. A predicted source signal verifier is responsive to the predicted source signal data arrays, for calculating replicated sensor signal data by combining the predicted source signal data with source delay values associated with each of the sources, and for verifying whether the replicated sensor signal data is acceptable by comparing them to the sampled sensor signal data. A predicted source signal adjuster, responsive to the predicted source signal verifier, adjusts the predicted source signal data in the predicted source signal arrays until the predicted source signal data is acceptable. In one embodiment, the signal processor further includes a source delay calculator, responsive to the sampled sensor signal data arrays, for calculating the source delays values using a cross-correlation process.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
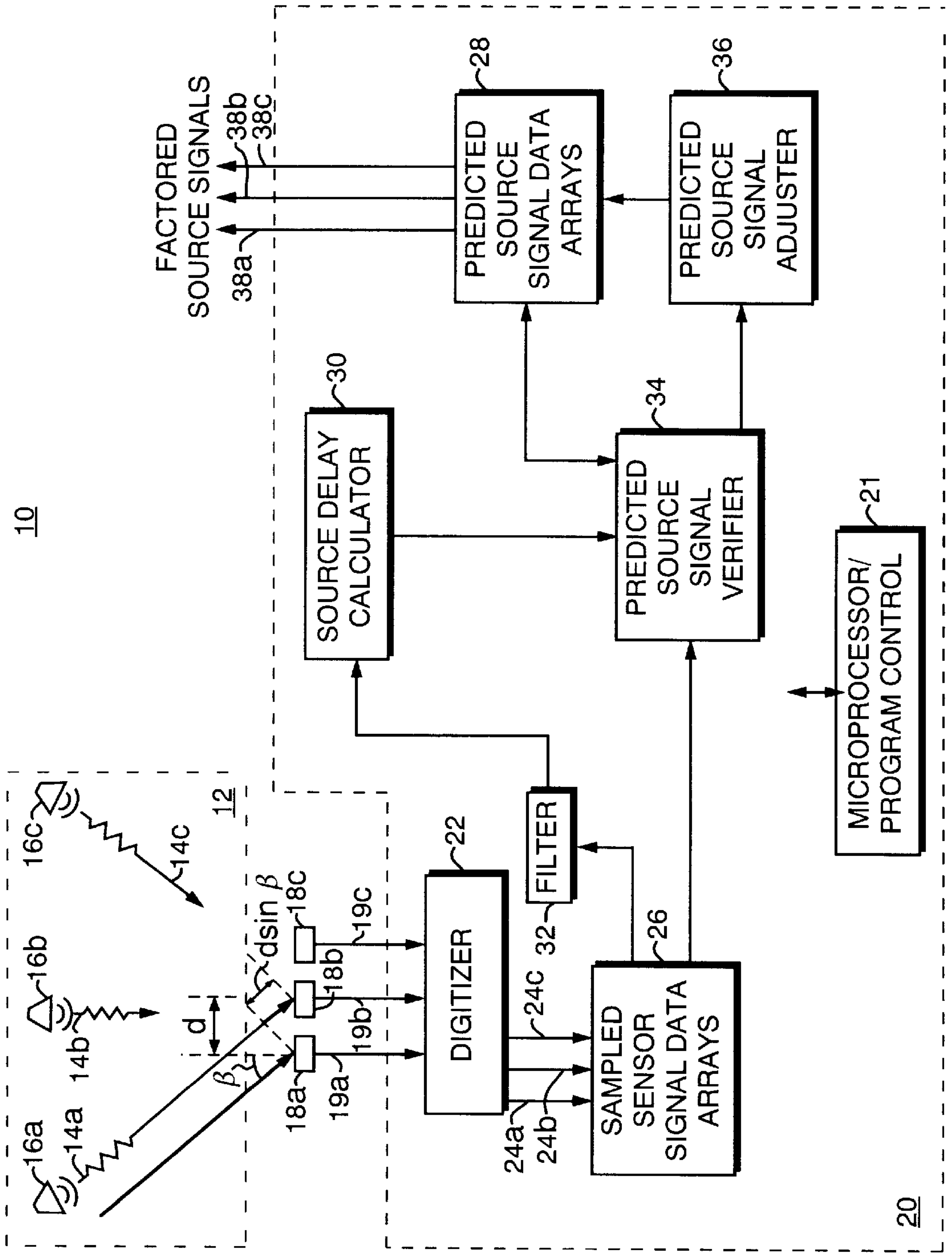
FIG. 1 is a schematic block diagram of the system for factoring a merged wave field into independent source signals, according to the present invention.

The system 10, FIG. 1, for factoring a merged wave field into independent components, according to the present invention, is used to factor a merged wave field 12 into independent signal components or source signals 14*a*–14*c*, which are independently generated by respective energy sources 16*a*–16*c* such that the source signals 14*a*–14*c* combine to produce the merged wave field 12. In the exemplary embodiment, the merged wave field 12 is an acoustic wave field produced by acoustic or sound sources 16*a*–16*c*, such as multiple voices or speech sources. The exemplary embodiment contemplates using this system 10 in a number of different applications including, but not limited to, a hearing aid, computer voice recognition, video conferencing, and other applications in which a single speech or sound source must be selected or isolated from among multiple sound sources. The present invention also contemplates using the concepts of the system and method described below to factor electro-magnetic wave fields or any other type of scalar or vector merged energy wave field.

The system 10 includes an array of sensors 18*a*–18*c* used to detect the merged wave field 12 and convert the merged wave field 12 into electrical sensor signals 19*a*–19*c*. In the exemplary embodiment, the sensors 18_a_–18_c_ are transducers or microphones capable of detecting acoustic waves. Where the system 10 is used to factor other types of merged wave fields, the array of sensors 18_a_–18_c_ includes transducers capable of detecting and converting that type of energy wave into an electrical signal.

In the exemplary embodiment, the sensor array includes three sensors—left sensor 18_a_, center sensor 18_b_, and right sensor 18_c_—each spaced apart by a distance d. According to the exemplary application, the system 10 is used to factor a merged wave field 12 formed by three energy sources—a left source 16_a_, a center source 16_b_ and a right source 16_c_. The center source 16_b_ is the on-axis source relative to the sensors 18_a_–18_c_ and the left and right sources 16_a_, 16_c_ are off-axis sources located in the left and right quadrants respectively. As shown, the left source 16_a_ has a bearing angle β.

In the exemplary hearing aid embodiment, three miniature microphones 18 spaced approximately 6 to 8 centimeters on the center apart can be used to sense the sound field of several sound sources 16 having different bearings with respect to the microphones. The three miniature microphones could be placed, for example, on the left and right temple and the nose bridge of an individual's eyeglasses.

Alternatively, the three microphones 18 could be placed with a similar geometry on a barrette secured to the front of the users clothing. The system 10 is preferably used to factor the sound coming from a target source located generally directly ahead of the wearer of the hearing aid. In the example shown in FIG. 1, the target source is the on-axis source or center source 16_b_ which is located generally directly ahead of the center sensor 18_b_.

As a result of the spacing of the sources 16_a_–16_b_ and sensors 18_a_–18_b_, the source signals 14_a_–14_c_ arrive at each of the sensors 18_a_–18_c_ at different times. Each of the energy sources 16_a_–16_c_ thus has a differential time delay or source delay with respect to each of the sensors 18_a_–18_c_. The source delays associated with the respective energy sources 16_a_–16_c_ are used to determine the factored source signals, as will be described in greater detail below.

According to the exemplary arrangement of sources 16_a_–16_c_ and sensors 18_a_–18_c_ shown in FIG. 1, the on-axis or center source 16_b_ generally has a zero differential time delay for the time of arrival at each of the sensors 18_a_–18_c_. For signals arriving from the left and right sources 16_a_, 16_c_, the off axis bearing produces differential time delays among the sensors 18_a_–18_c_. In other words, the left source 16_a_ has a left source delay $dt_l$ at the left sensor 18_a_ with respect to the center sensor 18_b_, and the right source 16_c_ has a right source delay $dt_r$ at the right sensor 18_c_ with respect to the center sensor 18_b_. The source delay dt associated with the off-axis sources is represented by the following equation:

$$dt = d * \sin(\beta)/v \qquad \text{Equation 1}$$

where d is the sensor spacing, β is the source bearing, and v is the speed of sound in air.

Although the exemplary embodiment shows only three sources, the system and method can be used to factor additional energy sources having various possible arrangements. Since the number of sources factored generally depends upon the application and the goal of the factoring procedure, the system and method can factor fewer sources than are actually present. Although the exemplary embodiment uses three sensors to factor the three energy sources, two sensors can be used to factor three sources with an increase in the number of iterations to achieve comparable results to that using three sensors and thus an increase in processing time.

The present invention also contemplates using additional sensors with various spacings and arrangements depending upon the particular use for the system. Although the hearing aid embodiment preferably assumes the center or on-axis energy source 16_b_ as the target source to be factored and transmitted to the user, the present invention can also be used to factor the off axis energy sources.

The system 10 includes a digital signal processor 20 that processes the electrical sensor signals 19_a_–19_c_ representing the merged wave field 12 to factor the merged wave field 12 into the independent components or source signals 14_a_–14_c_ generated by each independent energy source 16_a_–16_c_. The digital signal processor 20 can include a microprocessor 21 programmed with software to perform the factoring procedure or can include digital signal processor and/or clocked gate array circuitry that performs the factoring procedure. In the exemplary hearing aid embodiment, the digital signal processor 20 is preferably a compact device approximately 1 inch by 2.3 inches by 4 inches carried by the individual wearing the hearing aid, for example, in a shirt or dress pocket.

The digital signal processor 20 includes a digitizer 22 that digitizes or samples the electrical sensor signals 19_a_–19_c_ and outputs sampled sensor signals 24_a_–24_c_. One example of the digitizer includes a multiplexed 66,150 Hz 8 bit analog to digital (A/D) converter providing 3 outputs of 22,050 Hz 8 bit. The digital signal processor 20 also includes sampled sensor signal data arrays 26, for storing the sampled sensor signals 24_a_–24_c_ during processing. The digital signal processor can also set up additional arrays for storing calculated data during processing.

In general, the factoring of the merged wave field 12 into independent components is performed by predicting the components or source signals 14_a_–14_c_ using a random process and then verifying the predicted source signals. The predicted source signals are verified by combining the predicted source signals with the appropriate source delays associated with the respective sources 16_a_–16_c_ to replicate the sensor signals 24_a_–24_c_.

The digital signal processor 20 includes predicted source signal data arrays 28 that contain the predicted source signal data corresponding to the independent source signals 14_a_–14_c_ that form the merged wave field 12. The digital signal processor 20 also includes a source delay calculator 30 that obtains or calculates the source delays associated with each of the sources 16_a_–16_c_ relative to the sensors 18_a_–18_c_. The source delays can be calculated based upon an assumed geometry of the sources 16_a_–16_c_ or using a cross-correlation process.

One example of determining the source delays using an assumed geometry is based upon the geometry shown in FIG. 1. According to this assumed geometry, the target or center source 16_b_ is directly in front of the sensors 18_a_–18_c_ and thus has no sensible time delay at the left and right sensors 18_a_, 18_c_ with respect to the center sensor 18_b_. The off-axis left and right quadrant energy sources 16_a_, 16_c_ are assumed to have bearing angles β of 45° to the left and right respectively of the center or target source 16_b_. If the sources 16_a_–16_c_ have this assumed geometry and the sensors 18_a_–18_c_ have the preferred spacing described above, e.g., about 6 cm., the differential time delays $dt_l$, $dt_r$ are equal to 3 times the data sampling interval of the digitizer 22, i.e. ±3 sample intervals. As will be described in greater detail below, these assumed left and right quadrant source delays can be used to factor merged wave fields produced by energy sources that do not satisfy this particular geometry. The present invention also contemplates using fractional sample interval delays by using a Fourier transform, a frequency dependent phase shift, $\omega T_0$, and an inverse Fourier transform to obtain a predicted array shifted by $T_0$.

To determine the source delays using cross-correlation, the digital signal processor includes a filter 32 that filters the sampled sensor signal data, for example, by high pass filtering. One example of the filter that can be used is a $5^{th}$ order Butterworth, infinite impulse response high pass filter. The squared magnitude of the low pass analogous filter from which it is derived has the following form $|H_a(j\Omega)|^2=1/(1+(j\Omega/j\Omega_c)^{2n})$ where n is the filter order, $\Omega$ is the radian frequency, and $\Omega_c$ is the cutoff frequency. The source delay calculator 30 then processes the filtered sampled sensor signal data using the cross-correlation process, as will be described in greater detail below. Using cross-correlation more accurately determines the source delays for any particular source geometry and sensor spacing.

The digital signal processor 20 also includes a predicted source signal verifier 34, responsive to the predicted source signal data arrays 28, for combining the predicted source signal data corresponding to each source signal 14*a*–14*c* together with the appropriate source delays associated with each energy source 16*a*–16*c*, to form replicated sensor signal data corresponding to the merged wave field sensed at each of the sensors 18*a*–18*c*. The predicted source signal verifier 34 compares the replicated sensor signal data to the actual sampled sensor signal data to verify the predicted source signals.

The digital signal processor 20 also includes a predicted source signal adjuster 36, responsive to the predicted source signal verifier 34, for adjusting the predicted source signal data when the predicted source signal data is not verified by the verifier 34. The predicted source signal data arrays 28 are responsive to the predicted source signal adjuster 36 and are updated to include the adjustments made to the predicted source signal data. The predicted source signal verifier 34 then verifies the adjusted predicted source signal data in the predicted source signal data arrays 28.

This process continues through a number of iterations until the predicted source signal verifier 34 verifies the predicted source signal data stored in the predicted source signal array data arrays 28. The verified predicted source signal data is then output as factored source signals 38*a*–38*c* representing the source signals 14*a*–14*c* attributed to each of the sources 16*a*–16*c*. One or more of the factored source signals 38*a*–38*c* can then be selectively transmitted to the user, recorded, or otherwise further processed.

Figure 2:
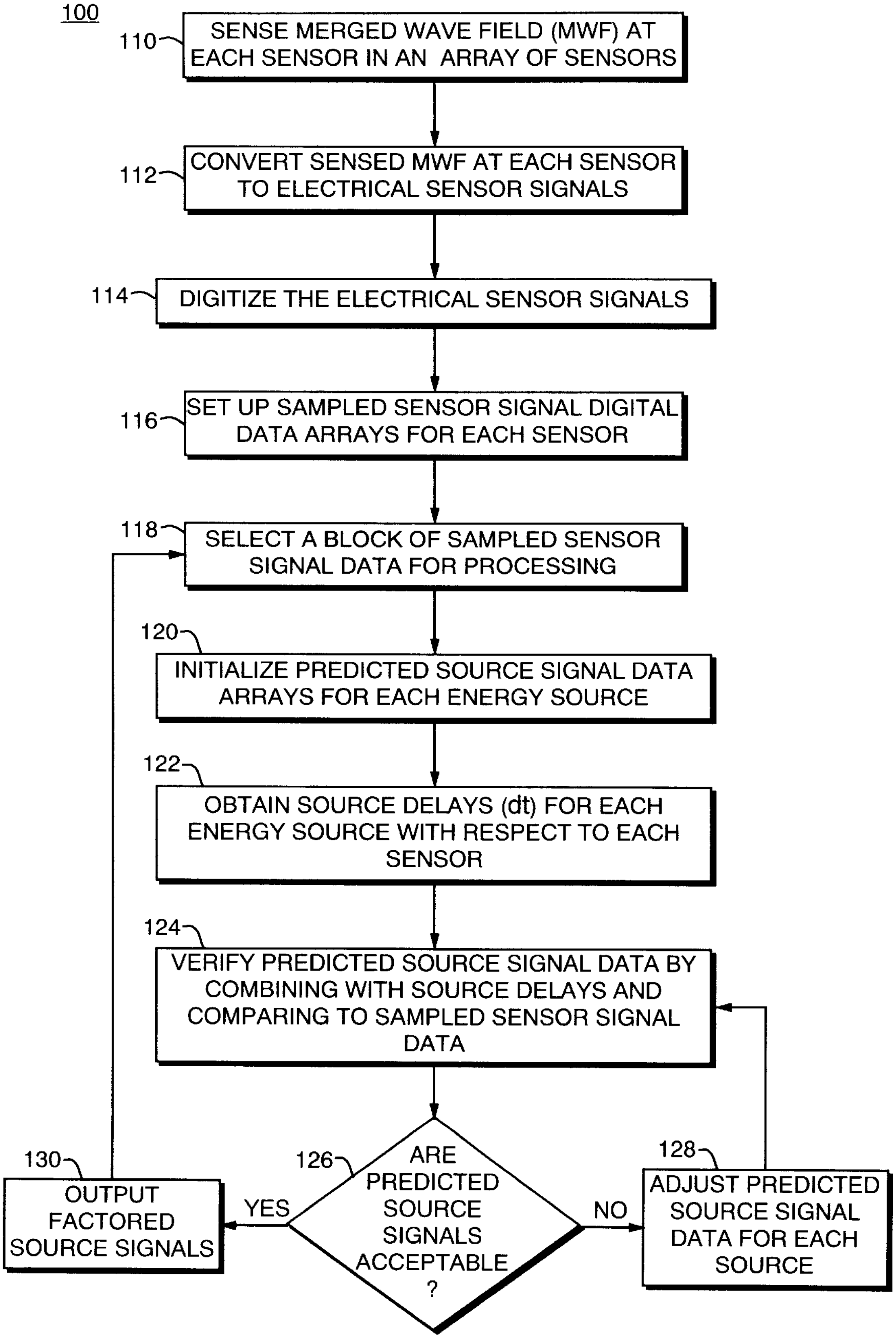
FIG. 2 is a flow chart illustrating the method of factoring a merged wave field into independent source signals, according to the present invention.

The method 100, FIG. 2, of factoring the merged wave field into independent components or source signals according to the present invention generally begins by sensing the merged wave field 12 at each sensor 18*a*–18*c* in the array of sensors, step 110. Each of the sensors 18*a*–18*c* converts the merged wave field into the electrical sensor signals 19*a*–19*c*, step 120. The electrical sensor signals 19*a*–19*c* are then multiplexed into the digitizer 22 and digitized or sampled, step 130. Using the 66,150 Hz 8 bit analog to digital converter, for example, to digitize the three electrical sensor signals 19*a*–19*c* produces three digital streams of sound data formatted at a sample rate of 22,050 Hz at 8 bit amplitude. The sampling frequency and bit depth can vary depending upon the requirements of the particular application for signal spectral band width and fidelity.

The sampled sensor signals 24*a*–24*c* are stored in sampled sensor signal digital data arrays 26 corresponding to each sensor 18*a*–18*c*, step 116. In one example, the sampled sensor signals 24*a*–24*c* are preferably buffered in multiple arrays having lengths of 1000 elements and containing 1000 bytes digitized to 8 bits. An array length of 1000 is short enough for the processing delay to be less than a tenth of a second, allowing the system to function in real time with no apparent delay in delivering the factored source signals to the user. The sampled sensor signal data can be shifted one or more bits to the left, allowing the prediction process to have an error that is a fraction of the least significant bit. After processing 3 more bits are added to the array to be able to work with a fraction of the least significant bit in an 8 bit integer. In addition to digitizing the sensor signals, the signals can be conditioned, for example, by matching the sensor gain and frequency response in all sensors.

Once the sampled sensor signal digital data arrays 26 have been established, a block of sampled sensor signal data from the arrays 26, is selected for processing, step 118. In one example, the sampled sensor signal data arrays 26 include at least first and second sets of 1K buffers. Once the first set of buffers have been filled with data from each of the sampled sensor signals 24*a*–24*c*, the sampled sensor signal data stream flows to the second set of buffers and processing of the block of data in the first set of buffers begins.

To store the predicted source signals, predicted source signal data arrays 28 are initialized for each energy source, step 120. Before the predicted source signals are verified, the predicted source signal data in each of the arrays 26 is shifted by an amount equal to the respective source delay associated with the source that is being predicted. The source delays associated with each off axis energy source 16*a*, 16*c* are obtained, step 122, based upon an assumed energy source geometry, as described above, or can be more accurately determined using a cross-correlation procedure, as will be described in greater detail below.

Once the predicted source signal data arrays 26 have been set up and the source delays have been obtained, predicted source signal data for each source is verified, step 124. To verify the predicted source signals, the predicted source signal data is combined with the appropriate source delays to form replicated sensor signals (also known as "witnesses") corresponding to the sampled sensor signals 24*a*–24*c*. The replicated sensor signals are compared to the sampled sensor signals to determine if the predicted source signals are acceptable, step 126. The comparison is preferably made by calculating a prediction verification factor using the replicated sensor signal data and the sampled sensor signal data and determining whether the prediction verification factor has reached a predetermined value.

In one example, the prediction verification factor is an objective function (also known as the "cost") that is minimized during the adjustment process, as will be described in greater detail below.

If the predicted source signals are found to be unacceptable, step 126, the predicted source signal data for each source is corrected or adjusted, step 128. The predicted source signal data is preferably adjusted using a random process that randomly determines whether to incrementally increase or decrease the predicted source signal data. In one example, the random adjustment process is managed using a simulated annealing algorithm, as will be described in greater detail below. The adjusted predicted source signal data is combined with the appropriate source delays to produce replicated sensor signals that are again compared to the actual sampled sensor signals by calculating the prediction verification factor. The process continues until the prediction verification factor reaches the predetermined value (i.e. the cost reaches an acceptable value) and the verified predicted source signals are output as the factored source signals, step 130. After the factored source signals have been output for further processing, another block of sampled sensor signal data can be selected for processing, step 118, and the process is repeated.

Figure 3A:
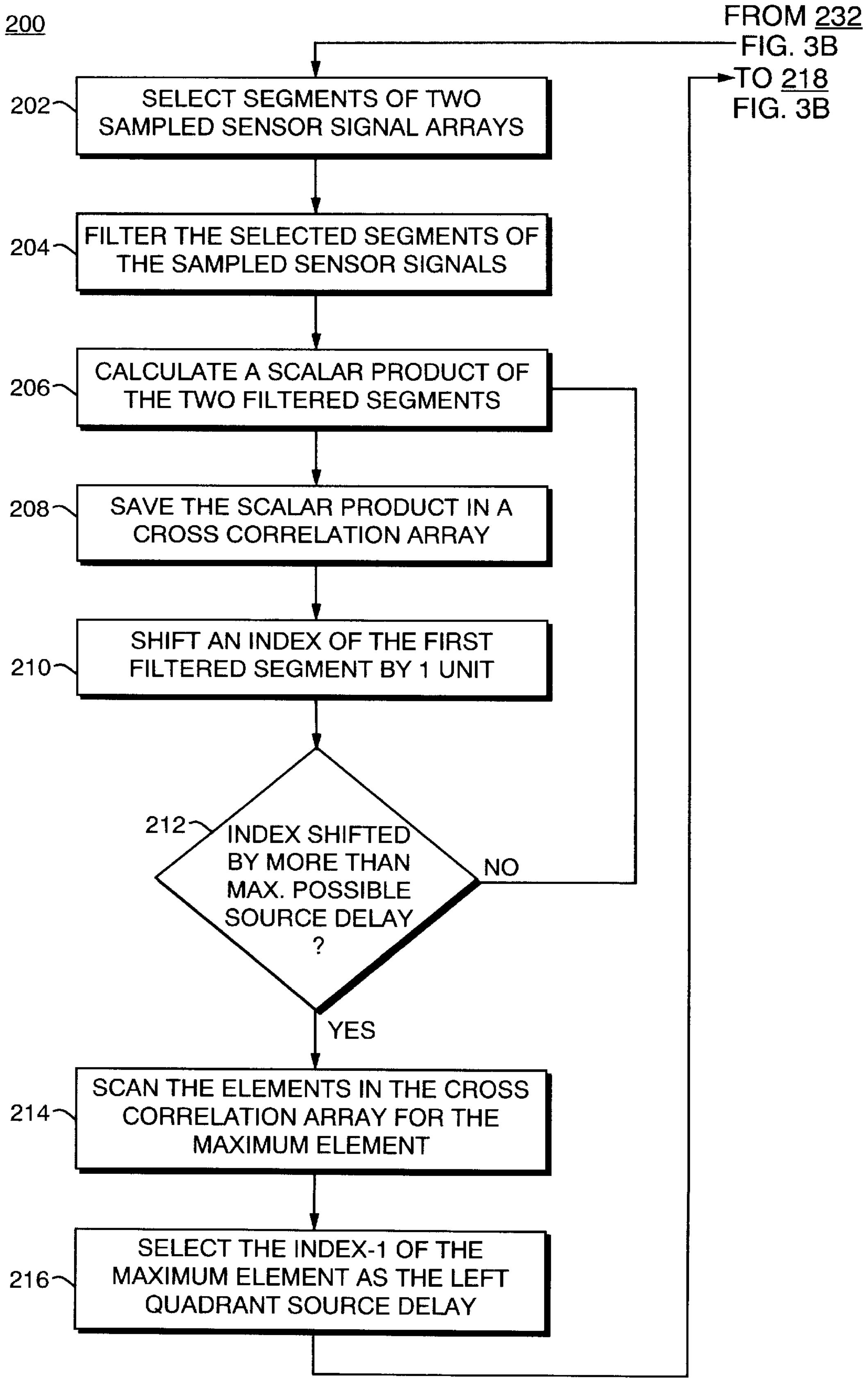
FIG. 3 is a flow chart illustrating a method of using cross-correlation to obtain source delays, according to one embodiment of the present invention.
Figure 3B:
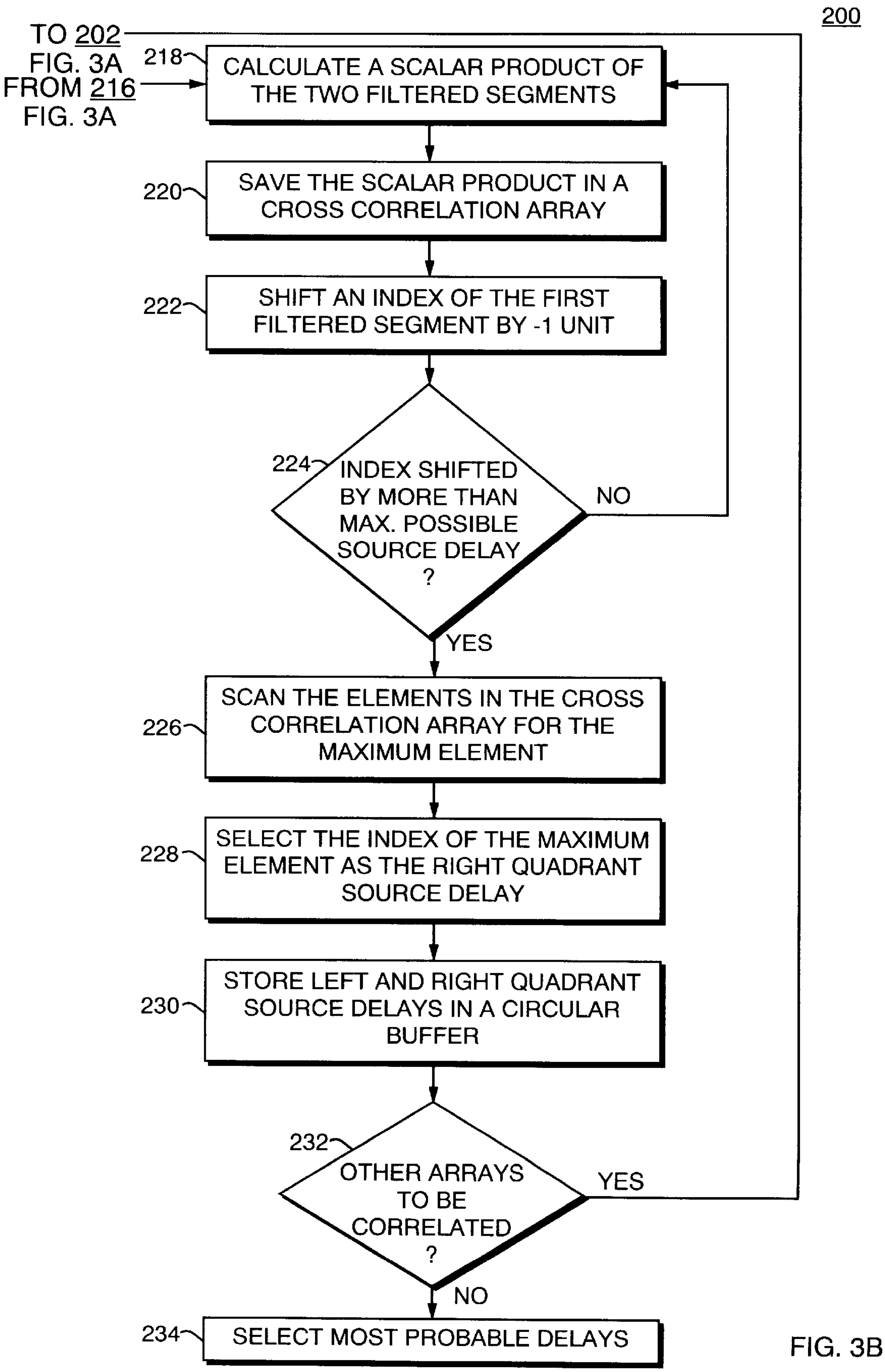

According to one embodiment, the source delays are determined from a cross-correlation procedure 200, FIG. 3. A segment of at least two of the sample sensor signal arrays 26 is selected, step 202, e.g., a first segment of the sampled sensor signal 24*b* from the center sensor 18*b* and a second segment of the sampled sensor signal 24*a* from the left sensor 18*a*. The length of the segments is preferably equal. The selected segments of the sampled sensor signal data are then filtered, step 204, using the filter 32. In one example, the segments are high pass filtered using a high pass filter 32, as described above, with a low frequency cutoff (e.g., about 650 Hz) that is fixed low enough to provide sufficient signal for processing and high enough to provide sufficient resolution in the partial cross correlation that is performed using the first and second filtered segments of sensor signal data.

A scalar product of the filtered first and second segments of sampled sensor signals is calculated, step 206, and the scalar product is saved in a cross correlation array, step 208. The sample index of the first filtered selected segment is then shifted by one unit, step 210. The process determines if the time interval corresponding to the shift of the sample index of the first filtered segment exceeds the maximum possible source delay for the selected sensor geometry, step 212. If the first filtered segment sample index has not been shifted by more units than the maximum possible source, step 212, another scalar product is taken of the shifted first filtered segment and the second filtered segment, step 206. The result of this scalar product is then saved as the next element in the cross correlation array, step 208. This process is repeated until the first filtered segment has been shifted by more units than the maximum possible source delay, step 212.

The data elements in the cross correlation array are then scanned to find the maximum element in the cross correlation array, step 214. The index minus 1 of the maximum element in the cross correlation array is then selected and saved as the delay for a source in the quadrant of negative delays, i.e. the left source delay, step 216.

To determine the source delay for a source in the quadrant of positive delays, i.e. the right source delay, the process of calculating a scalar product of the two filtered segments, step 218 and saving the scalar product in a cross correlation array, step 220, are repeated with the index of the first filtered segment shifted by minus 1 unit, step 222. When the index of the first filtered segment has been shifted in this direction by more units than the maximum possible source delay for the selected sensor geometry, step 224, the data elements in the cross correlation array are scanned for the maximum element 226. The index of the maximum element in the cross correlation array is then selected as the delay of a source in the quadrant of positive delays, i.e., the right source delay, step 228.

The preferred method further includes storing the left or negative quadrant source delay and right or positive quadrant source delay in memory, for example, in a circular buffer having a length of about twenty samples, step 230. This cross correlation process can then be repeated using other sampled sensor signal data from other sensors, if present, step 232. In the exemplary application, for example, the cross correlation procedure is repeated using segments of the sampled sensor signal data from the center sensor 18*b* and the right sensor 18*c*. The circular buffer is scanned after every cross correlation, and the most probable source delay is selected, step 234, for use in processing the predicted source signals. By storing the source delays in the circular buffer or other similar type of memory, the processing of the source delays is stabilized and the source delays can be determined despite the null results obtained during silent intervals of the arrays being correlated.

Although a source delay for a single energy source in each of the left and right quadrants is sufficient in the exemplary embodiment, the resulting data can be used to assign source delays to as many sources as is necessary in the processing of the predicted source signals.

The factoring of the merged wave field 12 into independent components or signal sources 14*a*–14*c* attributed to each energy source 16*a*–16*c* by predicting and verifying the source signals is a type of mathematical problem known as a non-deterministic polynomial (NP) time problem—a problem which has no analytic or deterministic solution, but whose solution is readily verified. The factoring process thus has an efficient solution and can be solved in a time increasing as a polynomial of time rather than exponentially with time. The NP solution for the merged wave field factoring process preferably uses a random process to predict the source signals and an objective function (known to those of ordinary skill in the art as the cost) to evaluate the predicted source signals. The random process is used to adjust the predicted source signals until the objective function reaches an acceptable value. A simulated annealing algorithm is preferably used to manage the random process such that a global reduction of the objective function is reached and the random process does not lock on a local minimum. Using the NP solution approach to factoring the merged wave field produces a vector output of independent factored source signals as opposed to the scalar output produced by the prior art adaptive array approach.

Figure 4A:
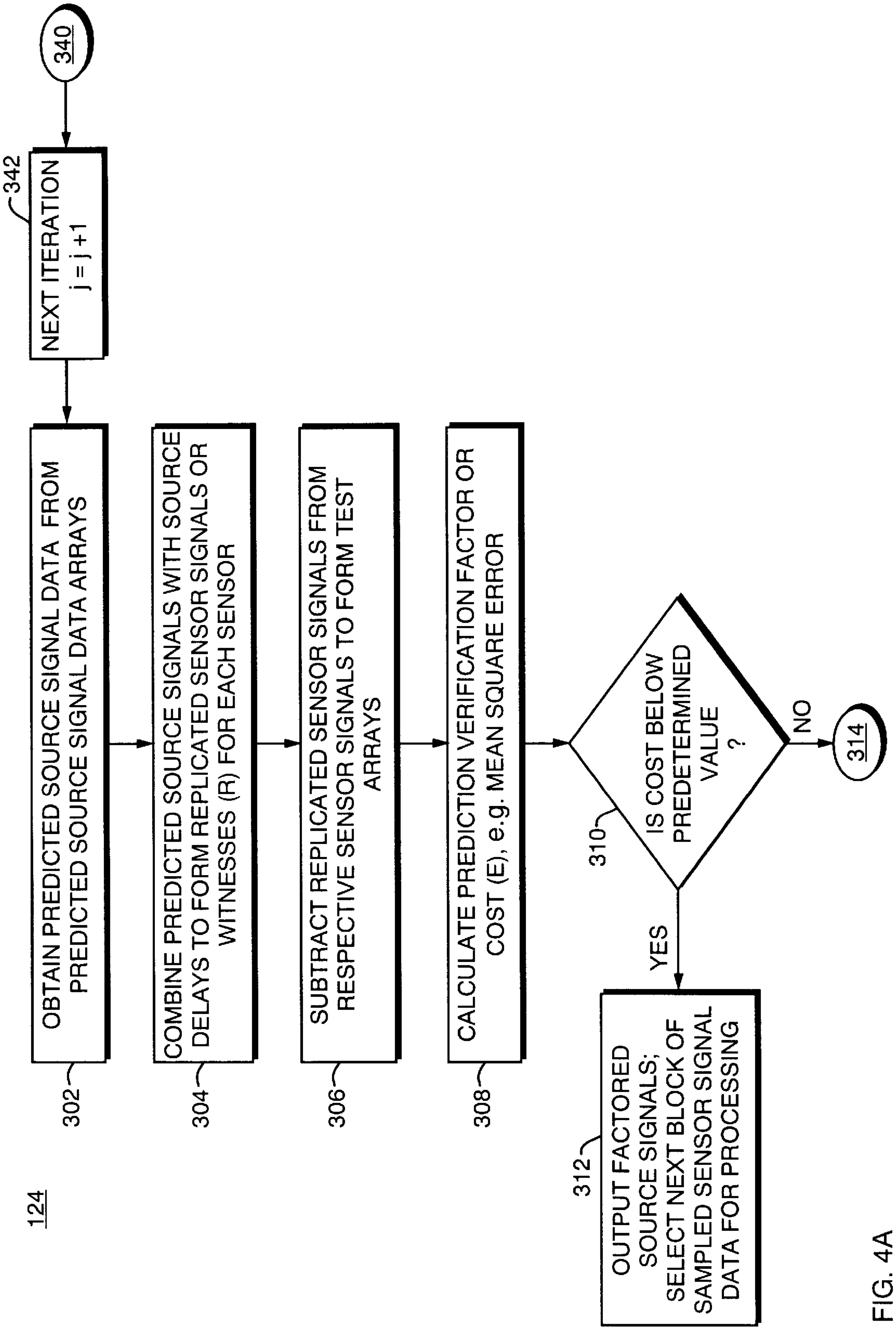
FIGS. 4A–4C are flow charts illustrating the method of verifying and adjusting predicted signal components, according to the preferred method of the present invention.
Figure 4B:
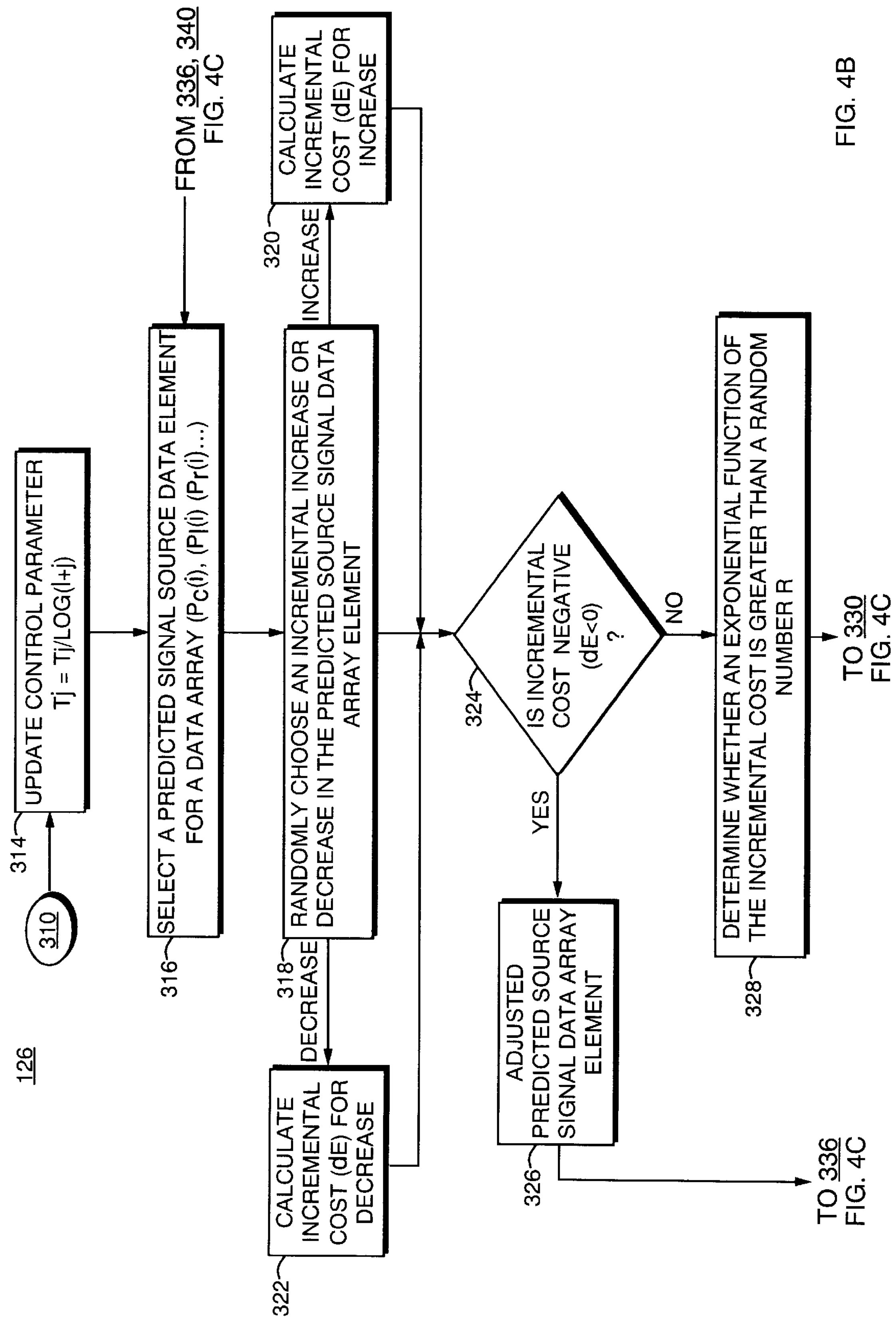
Figure 4C:
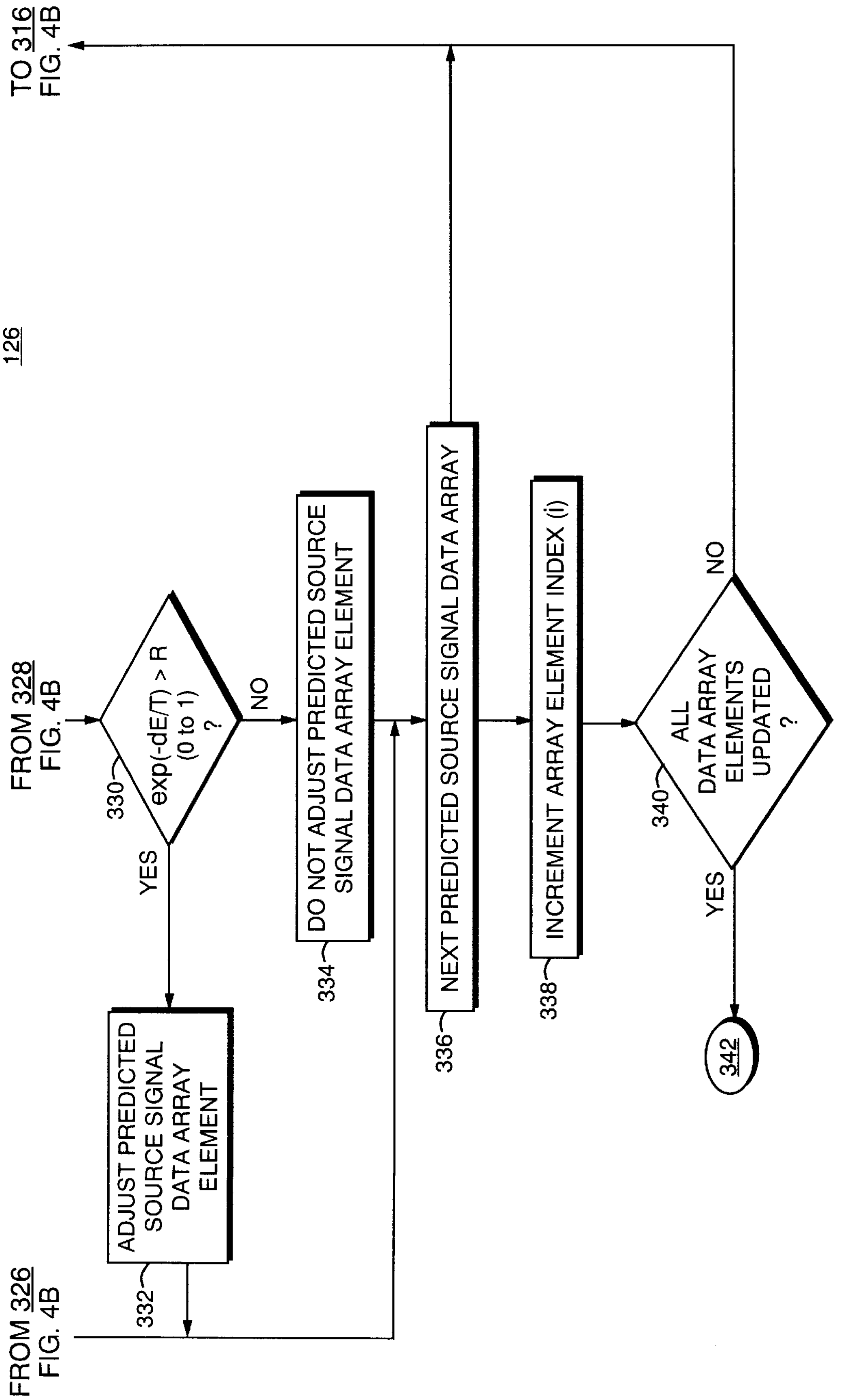

According to the preferred embodiment, the predicted source signal verification process 124, FIG. 4A, and the predicted source signal adjustment process 128, FIG. 4B, employ the NP solution for factoring the merged wave field by verifying and adjusting predicted source signals over a number of iterations (j) until the prediction verification factor or cost is acceptable. The predicted signal verification process 124, FIG. 4A, begins by obtaining predicted source signal data elements ($P_c$(i) $P_l$(i), $P_r$(i)) from the predicted source signal data arrays 28, step 302, where i is the index of the data elements in the arrays 28. The predicted source signal data is combined with the appropriate source delays ($dt_l$, $dt_r$) to form replicated sensor signal data or witnesses ($R_c$(i), $R_l$(i), $R_r$(i)) corresponding to the output of each of the sensors 18*a*–18*c*.

In the exemplary application, the indices of the predicted source signal data arrays ($P_l$(i), $P_r$(i)) corresponding to the off-axis sources are shifted by the respective source delays ($dt_l$, $dt_r$), which are represented as multiples of the sampling interval. The replicated sensor signals or witnesses are represented as follows:

$$R_c(i)=P_c(i)+P_l(i)+P_r(i)$$

$$R_l(i)=P_c(i)+P_l(i+dt_l)+P_r(i+dt_r)$$

$$R_r(i)=P_c(i)+P_l(i-dt_l)+P_r(i-dt_r)$$

Equations 2–4

The witnesses or replicated source signals are then subtracted from respective actual sampled source signals, and the difference between the replicated source signal data elements ($R_c$(i), $R_l$(i), $R_r$(i)) and the respective sampled sensor signal data elements ($S_c(i)$, $S_l(i)$, $S_r(i)$) are stored in test arrays ($T_c(i)$, $T_l(i)$, $T_r(i)$, step 304. In the exemplary embodiment, the test arrays are calculated as follows:

$$T_c(i)=S_c(i)-R_c(i)$$
$$T_l(i)=S_l(i)-R_l(i) \quad \text{Equations 5–7}$$
$$T_r(i)=S_r(i)-R_r(i)$$

Using the test arrays, the prediction verification factor or cost (E) is calculated, step 308. In the exemplary embodiment, the prediction verification factor is preferably the mean square error determined by squaring each element of the test arrays ($T_c(i)$, $T_l(i)$, $T_r(i)$ and summing the results over all of the arrays for each sensor and dividing by the number of array elements as shown by the following equation:

$$E=\sum_{i=1}^{n}(T_c(i)^2+T_l(i)^2+T_r(i)^2)/n \quad \text{Equation 8}$$

Next, the method determines whether the prediction verification factor or cost is below a predetermined value or minimum cost, step 310. The acceptable minimum cost is preferably determined upon installation of the processor 20 or prior to each session in which it is used. The minimum cost determines the perfection of the predicted source signals and is preferably not set so small that the processing cannot be done in real time. At the first iteration, the predicted source signals ($P_c(i)$ $P_l(i)$, $P_r(i)$) are typically null, and the initial prediction verification factor or cost (E) is the mean energy of the source signals ($S_c(i)$, $S_l(i)$, $S_r(i)$). The prediction verification factor or cost will typically not be reduced to the predetermined value until the predicted source signal adjustment and verification process has proceeded through a number of iterations. In one example, the predetermined value or minimum cost is reached in about 100 iterations. When the prediction verification is below the predetermined value, the predicted source signals are verified and output as factored source signals for further processing, step 312. As disclosed above, the method can then select another block of sampled sensor signal data for processing using the prediction verification and adjusting procedure.

When the prediction verification factor or cost is still above the predetermined value, the method proceeds with the predicted source signal adjustment process 128, FIG. 4B. Prior to adjusting the predicted source signal data, a control parameter (also known as the temperature parameter T) is updated, step 314, for use with the simulated annealing algorithm, as will be described in greater detail below. In the exemplary embodiment, the control parameter (T) is updated with an arbitrary function of the iteration number (j) as follows:

$$T_j=T_j/\log(1+j) \quad \text{Equation 9}$$

The predicted source signal adjustment process 126 then selects a predicted source signal data element from one of the predicted source signal data arrays ($P_c(i)$ $P_l(i)$, $P_r(i)$), step 316, beginning with an adjustment or correction for the first element (i=1) of the predicted signal source data array. The method then randomly chooses an incremental increase or decrease in the predicted source signal data array element, step 318. In one example, a random number generator produces a random number between 0 and 1. A random number greater than 0.5 suggests that the selected predicted source signal data array element be increased whereas a random number less than 0.5 suggests that the selected predicted source signal data array element be decreased.

If the random number suggests an increase, an incremental prediction verification factor or cost (dE) is calculated for the suggested incremental increase, step 320. Differentiation of the cost function shows that the incremental cost (dE) for a unit increase is equal to a small adjustable constant (dE0) minus the sum of the test arrays ($T_c(i)$ $T_l(i)$, $T_r(i)$) evaluated at the index (i) being considered increased by the appropriate delays as shown by the following equations:

$$dE_c(i)=dE0-(T_c(i)+T_l(i)+T_r(i))$$
$$dE_l(i)=dE0-(T_c(i)+T_l(i-dt_l)+T_r(i+dt_l)) \quad \text{Equations 10–12}$$
$$dE_r(i)=dE0-(T_c(i)+T_l(i-dt_r)+T_r(i+dt_r))$$

If the random number suggests a decrease, the incremental cost (dE) is calculated for the suggested incremental decrease, step 322. The incremental cost (dE) for a unit increase is equal to a small adjustable constant plus the sum of the test array elements ($T_c(i)$ $T_l(i)$, $T_r(i)$) increased by the appropriate delays as shown by the following equations:

$$dE_c(i)=dE0+(T_c(i)+T_l(i)+T_r(i))$$
$$dE_l(i)=dE0+(T_c(i)+T_l(i-dt_l)+T_r(i+dt_l)) \quad \text{Equations 13–15}$$
$$dE_r(i)=dE0+(T_c(i)+T_l(i-dt_r)+T_r(i+dt_r))$$

The process then evaluates the calculated incremental cost (dE) and determines whether or not to accept the suggested adjustment to the predicted source signal data element. If the incremental cost is found to be negative, step 324, then the suggested correction or adjustment in the predicted source signal data array element is accepted, step 326. Thus, the predicted source signals are randomly adjusted in a manner that lowers the cost and that moves toward verifying the predicted source signals. In the exemplary embodiment, the predicted source signal data array element is incremented (increased or decreased) by the sum of the test arrays used to determine the incremental cost (dE) divided by a positive number (Ia) that can be varied at the beginning of each iteration, step 326, as shown by the following equation:

$$P(i)=P(i)\pm(dE/Ia-Ib) \quad \text{Equation 16}$$

The adjustable parameters dE0, Ia, and Ib are set prior to the factoring process and are selected to optimize the algorithm. In general, the strategy is to make large corrections (i.e., increment or decrement) at the start of the iterations so as to move to the final predetermined value quickly. The incremental cost (dE) is scaled so that it will start large and grow small as the predetermined value is reached. To avoid correction by a full dE that may make the solution unstable, dE is divided by the positive number Ia, which is greater than 1. The scaling can be controlled by varying the parameter Ia prior to each iteration. To prevent the correction P(i) from becoming too small, the variable parameter Ib is subtracted or added, depending on whether the element is being increased or decreased, to set the level for a minimum correction. In one example, the parameters are initially set as follows: dE0=0, Ia=5, and Ib=1.

If the incremental cost is positive, the suggested adjustment is rejected unless simulated annealing is used to determine that the adjustment should be made. If simulated annealing is used, the method determines whether the exponential function, exp(−dE/T), of the incremental cost is greater than a random number between 0 and 1, step 328, where dE is the incremental cost previously calculated and T is the control or temperature parameter that is adjusted for each iteration. If the exponential function is greater than the random number, step 330, then the adjustment to the predicted source signal data array element is accepted, step 332. This simulated annealing technique allows for an occasional increase in the prediction verification factor or cost to prevent the random process that minimizes the cost from locking on a local minimum rather than proceeding to a global minimum.

If the incremental cost is positive and the exponential function of the incremental cost is less than the random number, the predicted source signal data array element is not adjusted, step 334. The process then proceeds to the element at the index (i) in the next predicted source signal data array, step 336, and the adjustment procedure 320 is repeated. Alternatively, the process of adjusting and verifying an element of the predicted source signal data for each predicted source signal data array, steps 314–334, can be parallel processed.

When the element at the selected index (i) in each of the predicted signal source data arrays ($P_c(i)$ $P_l(i)$, $P_r(i)$) has been processed, the sample index (i) is incremented, step 338, and the next element of each of the predicted signal source data arrays is processed accordingly. When all data array elements in each of the predicted signal source data arrays have been updated, step 340, the process returns to the verification procedure to perform another iteration (j=j+1), step 342. The verification procedure 300 then uses the adjusted predicted source signal data to form replicated source signals, step 304, calculate test arrays, step 306, and calculate the cost, step 308, and once again determine whether cost is below the predetermined value, step 310. The process continues through multiple iterations until the cost reaches the acceptable cost and the predicted source signals are output as factored source signals.

One advantage of the present invention is the ability to factor the merged wave field regardless of source bearing errors. The random process used to adjust and verify the predicted source signals is tolerant of any discrepancy between the assumed source delays and the actual source delays except that more iterations and processing time is required to obtain an accuracy comparable with that obtained using the correct source delays. Where the source delays are more accurately determined using the cross-correlation technique, fewer iterations are needed, thereby reducing processing time.

Another advantage of the system and method of the present invention is the ability to handle reverberation. The present invention handles reverberation by taking the target source as the energy source directly ahead of the sensors and processes the virtual sound sources caused by reverberation as left or right quadrant (off axis) sound sources. The reverberation thus would not appear in the prediction for the on axis source or target source that is being passed on to the user. Because of the tolerance of the present invention to errors in the source bearing, these virtual sound sources can be processed with minimal degradation of the factored target source signal. If one of the off axis sources is to be selected as the target source, then the system can use additional predicted source signals corresponding to additional off axis sources with these extra predicted source signals being used to absorb the reverberation or other sound interference.

A further advantage of the system and method of the present invention is the ability to use an array of sensors having a geometry with spacings much less than the wavelength of the dominant sound energy, for example, a spacing of the sensors that is less than a quarter of the wave length of the dominant speech frequencies. The relatively small spacing of the sensors in the array results in source delay units that are coarse grained. The ability of the present invention to factor the merged wave field with inaccurate source delays allows the use of an array of sensors with spacings much less than the wave length of the dominant sound energy.

In addition to being used in a hearing aid, the system of the present invention can be also used in other applications for factoring sound fields. For example, the array of microphones can be mounted on a computer monitor, and the voice of the user positioned in front of the computer can be factored and processed by the computer. The system can also be used by the media as a highly directional microphone by recording the factored source signal from one speech among a number of speech sources. The system can also be used in a group video-conferencing context by selecting a single speech source to use for transmission as the accompanying sound with the video.

Accordingly, the system and method of the present invention effectively factors a merged wave field into independent components or source signals generated by each of the separate energy sources to produce independent vector factored source signals. The system and method of the present invention effectively factors the merged wave field into the factored source signals without being dependent upon an accurate determination of the source delays associated with each of the energy sources relative to the sensors. The system and method of the present invention is also capable of accurately determining the off axis source delays using a cross correlation procedure, if desired. The system and method of the present invention also factors the merged wave field into the factored source signals in the presence of reverberation without significant degradation of the on axis target source by the reverberation.

Modifications and substitutions by one of ordinary skill in the art are considered to be within the scope of the present invention which is not to be limited except by the claims which follow.

What is claimed is:

1. A method of factoring a merged wave field into independent source signals, wherein each of said independent source signals is generated by a respective one of a plurality of energy sources that together produce said merged wave field, said method comprising:

sensing said merged wave field with an array of sensors;

converting said merged wave field sensed by each of said plurality of sensors into a plurality of electrical sensor signals representing said merged wave field sensed by each of said sensors;

digitizing each of said plurality of electrical sensor signals to form sampled sensor signal data representing said merged wave field sensed by each of said sensors;

establishing a plurality of predicted source signal data arrays, for storing predicted source signal data corresponding to each of said plurality of energy sources;

determining source delay values for each of said plurality of energy sources, wherein said source delay values represent a time differential of each of said independent source signals arriving at each sensor in said array of sensors;

verifying said replicated sensor signal data by combining said predicted source signal data corresponding to each of said energy sources with respective source delay values for each of said plurality of energy sources to produce replicated sensor signal data corresponding to each sensor in said array of sensors and by calculating a prediction verification factor using said replicated sensor signal data and said sampled sensor signal data;

adjusting said predicted source signal data using a random process;

repeating the steps of verifying and adjusting said predicted source signal data for a plurality of iterations until said prediction verification factor reaches a predetermined value wherein said predicted source signals are verified; and outputting verified predicted source signals as said factored independent source signals.

2. The method of claim 1 wherein said prediction verification factor is the mean squared difference of said sampled sensor signal data and said replicated sensor signal data.

3. The method of claim 1 wherein the step of adjusting said predicted source signal data includes:

a. choosing randomly one of an incremental increase and an incremental decrease of a predicted source signal data element from said predicted source signal data arrays;

b. calculating an incremental prediction verification factor based upon said one of said incremental increase and said incremental decrease of said predicted source signal data element;

c. determining whether to adjust said predicted source signal data element based upon said incremental prediction verification factor; and d. repeating steps a through c for each predicted source signal data element in each of said predicted source signal data arrays.

4. The method of claim 3 wherein said step of determining whether to adjust said predicted source signal data element based upon said incremental prediction verification factor includes adjusting said predicted source signal data element only if said incremental prediction verification factor is negative.

5. The method of claim 3 wherein said step of determining whether to adjust said predicted source signal data element based upon said incremental prediction verification factor includes:

adjusting said predicted source signal data element if said incremental prediction verification factor is negative; and adjusting said predicted source signal data element if an exponential function of said incremental prediction verification factor, $\exp(-dE/T)$, is greater than a random number between 0 and 1, where dE is said incremental prediction verification factor and T is a control parameter modified with each of said plurality of iterations.

6. The method of claim 3 wherein calculating said prediction verification factor includes:

subtracting said replicated sensor signal data from said sampled sensor signal data resulting in test arrays corresponding to each of said sensors;

squaring each data element in said test arrays;

summing the squared data elements over all of said test arrays; and dividing the sum by a number of test array elements.

7. The method of claim 1 wherein the step of determining source delay values for each of said plurality of energy sources includes assigning at least one predetermined source delay value based upon an assumed arrangement of said energy sources and said array of sensors.

8. The method of claim 7 wherein said at least one predetermined source delay value includes a right quadrant source delay value and a left quadrant source delay value.

9. The method of claim 1 wherein the step of determining source delay values for each of said plurality of energy sources includes a cross-correlation process.

10. The method of claim 9 wherein said cross-correlation process comprises the steps of:

a. selecting segments of a pair of sampled sensor signals from said sampled sensor signal data;

b. filtering each said segment of said pair of sampled sensor signals to form first and second filtered sensor signal segments;

c. calculating a scalar product of said first and second filtered sensor signal segments;

d. saving said scalar product in a cross correlation array;

e. shifting an index of said first filtered sensor signal segment by one unit to form a shifted first filtered sensor signal segment;

f. repeating steps c–e until said shifted first filtered sensor signal segment has been shifted more than a predetermined maximum number of units; and g. determining said source delay value based upon an index of said maximum element in said cross-correlation array.

11. The method of claim 10 further including the steps of:

selecting segments of a different pair of sampled sensor signals from said sampled sensor signal data;

repeating cross-correlation steps b–g;

storing each said source delay value in a buffer; and selecting a most probable source delay value.

12. The method of claim 1 wherein said sensor array includes two sensors, and wherein said plurality of energy sources includes three energy sources.

13. The method of claim 1 wherein said merged wave field is a merged acoustic field having independent acoustic source signals produced by respective acoustic sources, and wherein said array of sensors includes acoustic sensors.

14. The method of claim 13 wherein said acoustic sources include speech sources.

15. The method of claim 13 wherein said array of acoustic sensors includes three acoustic sensors.

16. The method of claim 14 further including:

selecting one of said energy sources as a target source;

converting said factored independent source signal data corresponding to said target source into a factored acoustic signal; and transmitting said factored acoustic signal to at least one ear of a user.

17. The method of claim 16 wherein said plurality of energy sources include three energy sources and said target source is a center source of said three energy sources.

18. The method of claim 14 further including recording said factored source signal data.

19. The method of claim 1 wherein said merged wave field is a merged electromagnetic field having a plurality of electromagnetic wave components produced by a plurality of electromagnetic sources.

20. A system for factoring a merged wave field into independent source signals, wherein each of said independent source signals is generated by a respective one of a plurality of energy sources that together produce said merged wave field, said system comprising:

an array of sensors, for sensing said merged wave field and converting said merged wave field into a plurality of electrical sensor signals;

a digitizer, responsive to said array of sensors, for digitizing said plurality of electrical sensor signals to form sampled sensor signal data corresponding to each of said array of sensors;

a signal processor, responsive to said digitizer, for processing said plurality of sampled sensor signals and for determining factored source signals, said signal processor including:

sampled sensor signal data arrays, responsive to said digitizer, for storing said sampled sensor signal data for each of said sensors;

predicted source signal data arrays, for storing predicted source signal data corresponding to each of said plurality of energy sources;

a predicted source signal verifier, responsive to said predicted source signal data arrays, for calculating replicated sensor signal data by combining said predicted source signal data with source delay values associated with each of said plurality of energy sources, and for verifying whether said replicated sensor signal data is acceptable by comparing to said sampled sensor signal data; and a predicted source signal adjuster, responsive to said predicted source signal verifier, for adjusting said predicted source signal data in said predicted source signal arrays until said replicated sensor signal data is acceptable.

21. The system of claim 20 wherein said merged wave field is a merged acoustic field having a plurality of acoustic source signals produced by a plurality of acoustic sources, and wherein said array of sensors includes acoustic sensors.

22. The system of claim 20 wherein said signal processor includes:

a filter, responsive to said sampled sensor signal data arrays, for filtering segments of said sampled sensor signal data;

a source delay calculator, responsive to said filter, for calculating said source delay values using filtered segments of said sampled sensor signal data and a cross correlation process, and wherein said predicted source signal verifier is responsive to said source delay calculator, for receiving said source delay values used to calculated said predicted merged wave field data.

23. The system of claim 20 wherein said predicted source signal verifier calculates a prediction verification factor using said replicated sensor signal data and said sampled sensor signal data.

24. The system of claim 20 wherein said predicted source signal adjuster adjusts said predicted source signal data using a random process and a simulated annealing algorithm.

25. A hearing system for selectively hearing a single sound component in a merged sound field, said single sound component being generated by one of a plurality of sound sources that together produce said merged sound field, said system comprising:

an array of acoustic sensors, for sensing said merged sound field and converting said merged sound field into a plurality of electrical sensor signals;

a digitizer, responsive to said array of acoustic sensors, for digitizing said plurality of electrical sensor signals to form sampled sensor signal data corresponding to each of said array of sensors;

a signal processor, responsive to said digitizer, for processing said plurality of sampled sensor signals and for determining said single sound component, said signal processor including:

sampled sensor signal data arrays, responsive to said digitizer, for storing said sampled sensor signal data for each of said sensors;

predicted source signal data arrays, for storing predicted source signal data corresponding to each of said plurality of sound sources;

a predicted source signal verifier, responsive to said predicted source signal data arrays, for calculating replicated sensor signal data by combining said predicted source signal data with source delay values associated with each of said plurality of sound sources, and for verifying whether said replicated sensor signal data is acceptable by comparing to said sampled sensor signal data; and a predicted source signal adjuster, responsive to said predicted source signal verifier, for adjusting said predicted source signal data in said predicted source signal arrays until said replicated sensor signal data is acceptable.

* * * * *